US006490962B1

(12) United States Patent
Schultz

(10) Patent No.: US 6,490,962 B1
(45) Date of Patent: Dec. 10, 2002

(54) HYDRAULIC TOOL WITH AN OC/CC SELECTOR

(75) Inventor: Theodore J. Schultz, West Linn, OR (US)

(73) Assignee: The Stanley Works, New Britain, CT (US)

( * ) Notice: Subject to any disclaimer, the term of this patent is extended or adjusted under 35 U.S.C. 154(b) by 0 days.

(21) Appl. No.: 09/858,905

(22) Filed: May 17, 2001

(51) Int. Cl.[7] .................... F16B 11/08

(52) U.S. Cl. .................... 91/428

(58) Field of Search .................... 91/444, 454, 428; 92/108; 137/270.5

(56) References Cited

U.S. PATENT DOCUMENTS

| | | | | |
|---|---|---|---|---|
| 1,904,345 A | | 4/1933 | Anthony et al. | |
| 2,233,521 A | | 3/1941 | Ernst et al. | |
| 2,389,654 A | | 11/1945 | Van Der Werff | |
| 3,450,006 A | | 6/1969 | White | |
| 3,694,839 A | | 10/1972 | Loblick | |
| 3,882,883 A | | 5/1975 | Droegemueller | |
| 4,256,433 A | | 3/1981 | King | |
| 4,273,029 A | | 6/1981 | Sheppard | |
| 4,366,673 A | | 1/1983 | Lapp | 60/477 |
| 4,548,229 A | | 10/1985 | Johnson | 137/270 |
| 4,589,437 A | | 5/1986 | Zeuner et al. | |
| 5,419,129 A | * | 5/1995 | Becker et al. | 60/452 |
| 5,442,992 A | | 8/1995 | Sanner et al. | 91/428 |
| 5,778,755 A | | 7/1998 | Boese | 91/437 X |

* cited by examiner

*Primary Examiner*—John E. Ryznic
(74) *Attorney, Agent, or Firm*—Pillsbury Winthrop LLP

(57) ABSTRACT

A hydraulic tool is operable in an open center (OC) and a closed center (CC) mode and includes a cylinder and a piston within the cylinder. The piston defines a drive chamber and a retract chamber. A valve spool selectively supplies and exhausts hydraulic fluid to and from the drive chamber and the retract chamber. An oil tube is coupled to the valve spool and extends through the piston and is in communication with the retract chamber. The oil tube includes at least one hole that can selectively communicate the drive chamber and the retract chamber. A selector sleeve is provided for switching between the OC and CC modes. In the OC mode when the tool is in the neutral mode, the valve spool is configured to supply the hydraulic fluid through the oil tube to the retract chamber such that movement of the piston can allow communication between the retract chamber and the drive chamber through the at least one hole in the oil tube.

30 Claims, 4 Drawing Sheets

HYDRAULIC TOOL WITH AN OC/CC SELECTOR

BACKGROUND OF THE INVENTION

1. Field of the Invention

This invention relates to hydraulic tools, and more particularly to hydraulic tools that can use a constant pressure fluid delivery system or a constant volume fluid delivery system. In particular, this invention relates to a hydraulic tool having a selector sleeve that is selectively adjustable to operate the tool in an "open center" (OC) mode or a "closed center" (CC) mode.

2. Description of Related Art

U.S. Pat. No. 5,778,755 is directed to a control apparatus 22 for operating a hydraulic tool 20 that can use a constant volume or constant pressure fluid system. The constant volume or OC mode of operation is shown in FIGS. 1–3, and the constant pressure or CC mode of operation is shown in FIGS. 4 and 5.

The control apparatus 22 includes a housing 32 having a cavity 34 in which a piston 36 reciprocates. The piston 36 divides the cavity 34 into a drive chamber 44, which is positioned to the left of the piston 36, and a retract chamber 42, which is positioned to the right of the piston 36. An adjustment assembly 48 is retained in the drive chamber 44 to control fluid flow between the retract chamber 42 and the drive chamber 44 in a neutral mode. The control apparatus 22 also includes a handle structure 49 containing a valve assembly 50. Inlet and outlet ports 52, 54 can be connected to a constant volume or constant pressure fluid source. A central port 56 selectively connects the inlet port 52 with the retract chamber 42. A cross port 58 communicates with the drive chamber 44 and selectively with the outlet port 54.

The piston 36 includes a plurality of shuttle valves 66 having shuttle spools 68 that are retained in shuttle ports 70 formed in the piston 36. Enlarged heads 72, 74 are provided on each end of the shuttle spool 68. Each shuttle valve 66 operates along a valve axis 78 that is generally parallel to the central axis 76.

The adjustment assembly 48 allows the control apparatus to be operated in the OC or CC mode. The adjustment assembly 48 includes a control body or annular member 82 which is attached to adjustment shafts 84 extending through a shaft bore 86 in the housing 32. The control body 82 can be moved between a first position (FIGS. 1–3) and a second position (FIGS. 4 and 5) by use of drive heads 96 that are connected to the adjustment shafts 84, and are accessible to the outside of the housing 32. In the first position, the control body 82 extends away from a recess 106, and in the second position, the control body 82 is received within the recess 106. The control body 82 has an annular shape that provides a continuous circumferential contact surface 102 that can contact the shuttle valves 66 (FIG. 1) regardless of their circumferential orientation.

When the adjustment assembly 48 is configured for use with a constant volume system, the shuttle valves 66 are moved as a result of contacting the adjustment assembly 48 when the piston 36 is retracted. Movement of the spool valves 66 unseats valve heads 74 from the shuttle port 70. By disengaging the heads 74 fluid flows from the retract chamber 42 to the drive chamber 44 when the piston is in a neutral position as shown in FIG. 1. As shown in FIG. 4, the adjustment assembly is spaced away from the spool valves 66 for use with a constant pressure system thereby preventing engagement with the shuttle spool valve 66 causing the spool valve heads 74 to seal the shuttle port 70 when the piston 36 is in a neutral position.

A step-by-step description of the operation is now described. In FIG. 1, the adjustment assembly 48 is positioned in the constant volume or OC mode. The piston 36 is in the fully retracted position in which the shuttle valves 66 are opened by contact of the head 72 against the control body 82. This neutral position allows fluid to continuously flow from the inlet port 52, through the control apparatus 22 (i.e., the central port 56, tubular conduit 108, retract chamber 42, and around valve spools 66), and back through the outlet port 54 via cross port 58.

In FIG. 2, trigger 64 is actuated to communicate the inlet port 52 with the cross port 58, which in turn supplies pressurized fluid to the drive chamber 44 to drive the piston 36. During this movement, the heads 72 are maintained in their position against the piston. Fluid from the retract chamber 42 is exhausted through the central conduit 108, the central port 56 and the outlet port 54.

In FIG. 3, the trigger 64 has been released following a crimping operation. Release of the trigger 64 re-establishes communication between the inlet port 52 and the central port, central conduit 108 and the retract chamber 42 to slide the piston 36 to its retracted position. During this movement, the spool valves 66 slide on the piston 36 so that the heads 74 contact the piston 36, until such time as the piston reaches the fully retracted position. At that time, the heads 72 engage the control body 82, and the heads 74 are separated from the piston 36 to allow pressurized fluid to pass though the piston 36 and to the outlet port 54 via the cross port 58.

The closed volume or CC mode of operation is shown in FIGS. 4 and 5. The only difference in these figures is that the control body 82 has been placed in the recess 106 so that it does not contact the heads 74 when the tool is in the neutral position, (FIG. 4). As such, the pressurized fluid (that is supplied via the inlet port 52, central conduit 56 and tubular conduit 108) is maintained in the retract chamber 42 and does not pass through the piston 36.

The operation of the tool in the CC mode in FIG. 5 is the same as the operation of the tool in the OC mode in FIG. 2. Further, when the trigger is released, the shuttle valves 66 will slide such that heads 74 contact the piston 36. However, upon reaching the fully retracted position, the heads 72 will not contact the control body 82 so that constant pressure is maintained on the piston 36.

U.S. Pat. No. 5,442,992 patent discloses a reciprocating hydraulic tool 20 in the form of a shade tree pruner. The tool 20 includes a cylinder 40 having a piston 34 that reciprocates between a fully extended position and a retracted position. The tool 20 is referred to in the art as a "pull to cut" tool since the blades 26, 28 of the pruner start in the open position, and when the trigger 90 is actuated, hydraulic fluid is supplied to the side of the piston 34 remote from the trigger 90. This causes the piston to move toward the trigger, and the blade 26 is pulled toward the blade 28 to perform a cutting operation.

The tool 20 can use either a constant pressure (CC) or a constant volume (OC) source of hydraulic fluid. A selector 60 is rotatably mounted on the cylinder to enable the tool to be used in the OC or CC modes. FIGS. 1 and 2 show the selector 60 in the OC mode, and FIGS. 3 and 4 show the selector in the CC mode.

In FIGS. 1 and 2, the selector 60 defines a passageway 62 that communicates between opposite sides of the piston 34 when the piston is in its fully advanced position with respect to the cylinder, as shown in FIG. 1. In this fully advanced position, the piston is fully advanced with respect to the end 58 of the cylinder which is opposite its end 44 at which the valve body 42 is coupled.

In the second position of the selector 60 as illustrated in FIGS. 3 and 4, the passage 62 is rotated out of a position for communicating between the opposite sides of the piston 34. Additionally, the passage 62 mounts a one-way check valve 68 that limits fluid flow to a single direction, from a side 70 of the piston 34 that faces the first end 44 of the cylinder and the opposite side 56 of the piston that faces the opposite end 58 of the cylinder 40.

In FIGS. 1 and 3, the tool 20 is in the neutral position. Hydraulic fluid is supplied by the pressure port 49 to a cross port 52 that supplies the fluid to the cylinder 40, which is maintained in the fully extended position. Fluid from the opposite side of the piston is exhausted through the conduit 54, short port 55 and outlet port 51.

In FIG. 1, the selector 60 is positioned such that, when the piston is in the fully extended position, the fluid can enter the passageway 62 of the selector 60, pass through holes 64 and 66 in the cylinder 40, the check valve 68, and return to the conduit 54 and outlet port 51. This is the OC mode of operation.

FIG. 3 differs in this respect because the selector 60 is rotated so that the passageway 62 does not align with the holes 64, 66 of the cylinder 40, which disables communication between the opposite ends of the piston 34. Therefore, fluid is supplied to the cross port 52 and the left side of the piston, while fluid from the right side of the piston is exhausted. This is the CC mode of operation.

In FIGS. 2 and 4, the trigger has been actuated to perform a cutting operation. Fluid is supplied to the conduit 54, which in turn provides the fluid to the side 56 of the piston 34 that is remote from the trigger. At the same time, fluid is exhausted (via cross port 52, axial port 92, and outlet port 50) from the side 70 of the piston that faces the trigger. This causes the piston to move toward the trigger.

As opposed to FIGS. 2 and 4 (the CC mode), the selector 60 in FIGS. 1 and 3 (the OC mode) is positioned so that fluid can flow from the holes 64, 66 into the passageway 62. However, the ball 80 of the check valve 68 is maintained in the closed position by use of a spring 82.

The 755 and 992 patents are complicated in design and require that a short circuit for the OC mode of operation be provided by using a passage in or around the piston. Thus, a need has developed in the art to provide a hydraulic tool in which modification of the piston and/or the cylindrical housing is not necessary to short circuit flow in the OC mode of operation.

SUMMARY OF THE INVENTION

One aspect of the invention is to provide a hydraulic tool having a selector member that can be switched easily between the OC and CC modes of operation. The tool may be a reciprocating tool such as a crimper, but it is not limited to reciprocating type tools.

Another aspect of the invention is to provide a hydraulic tool, which is preferably piston actuated, in which a short circuiting hole or conduit can be provided in an oil tube that communicates between the valve spool and a side of the piston opposite the oil tube. The short circuiting hole or conduit can be provided such that fluid need not go around, through or even reach the piston and/or a cylinder that houses the piston.

According to one exemplary embodiment of the invention, a hydraulic tool switchable between an open center mode and a closed center mode and having a work mode and a neutral mode comprises a cylinder defining a chamber, a piston within the chamber and operable in the neutral mode and the work mode, the piston defining a drive chamber and a retract chamber within the chamber, a valve operable to selectively supply hydraulic fluid to the drive chamber to thereby drive the piston to a first position when the tool is in the work mode, and to selectively supply the hydraulic fluid to the retract chamber to thereby move the piston to a second position when the tool is in the neutral mode, a fluid inlet and a fluid outlet in fluid communication with the valve; an oil tube in fluid communication with the valve and extending through the piston and being in communication with the retract chamber, the oil tube including opposite ends and at least one hole between said ends, and a mode selector being positionable between a first position in which the tool can operate in the open center mode in which the tool can utilize a constant volume fluid delivery source, and a second position in which the tool can operate in the closed center mode in which the tool can utilize a constant pressure fluid delivery source. In the open center work mode the valve is configured to supply the hydraulic fluid through the oil tube to the drive chamber to drive the piston to the first position. When the tool is moved to the neutral mode, the valve is configured to supply the hydraulic fluid through the oil tube to the retract chamber such that movement of the piston to the second piston can allow communication between the inlet and outlet through the at least one hole in the oil tube.

According to another exemplary embodiment of the invention, a hydraulic tool comprises a cylinder defining a chamber and a piston within the chamber and operable in a neutral mode and a work mode, the piston defining a drive chamber and a retract chamber within the chamber. A valve is operable to selectively supply hydraulic fluid to the drive chamber to thereby drive the piston when the tool is in the work mode, and to selectively supply the hydraulic fluid to the retract chamber when the tool is in the neutral mode. A mode selector member is positionable between a first position in which the tool can operate in an open center mode in which the tool can utilize a constant volume fluid delivery source, and a second position in which the tool can operate in a closed center mode in which the tool can utilize a constant pressure fluid delivery source. In the open center mode when the tool is in the neutral mode, the valve is configured to supply the hydraulic fluid to the retract chamber until filled, whereupon any excess hydraulic fluid is exhausted to an outlet port before it reaches the chamber or the piston.

In yet another exemplary embodiment of the invention, a hydraulic tool comprises a cylinder defining a chamber, a piston within the chamber and operable in a neutral mode and a work mode, the piston defining a drive chamber and a retract chamber within the chamber, and a valve operable to selectively supply hydraulic fluid to the drive chamber to thereby drive the piston when the tool is in the work mode, and to selectively supply the hydraulic fluid to the retract chamber when the tool is in the neutral mode. The tool can operate in a open center mode in which the tool can utilize a constant volume fluid delivery source. In the open center mode when the tool is in the neutral mode, the spool is configured to supply the hydraulic fluid to the retract chamber until filled, whereupon any excess hydraulic fluid is exhausted to the outlet port before it reaches the chamber or the piston.

These and other aspects of the invention will be described in or become apparent from the following detailed description of preferred embodiments.

BRIEF DESCRIPTION OF THE DRAWINGS

Preferred embodiments of the invention will be described in conjunction with reference to the following drawings, in which like reference numbers indicate like parts, wherein.

DETAILED DESCRIPTION OF PREFERRED EMBODIMENTS

Figure 1:
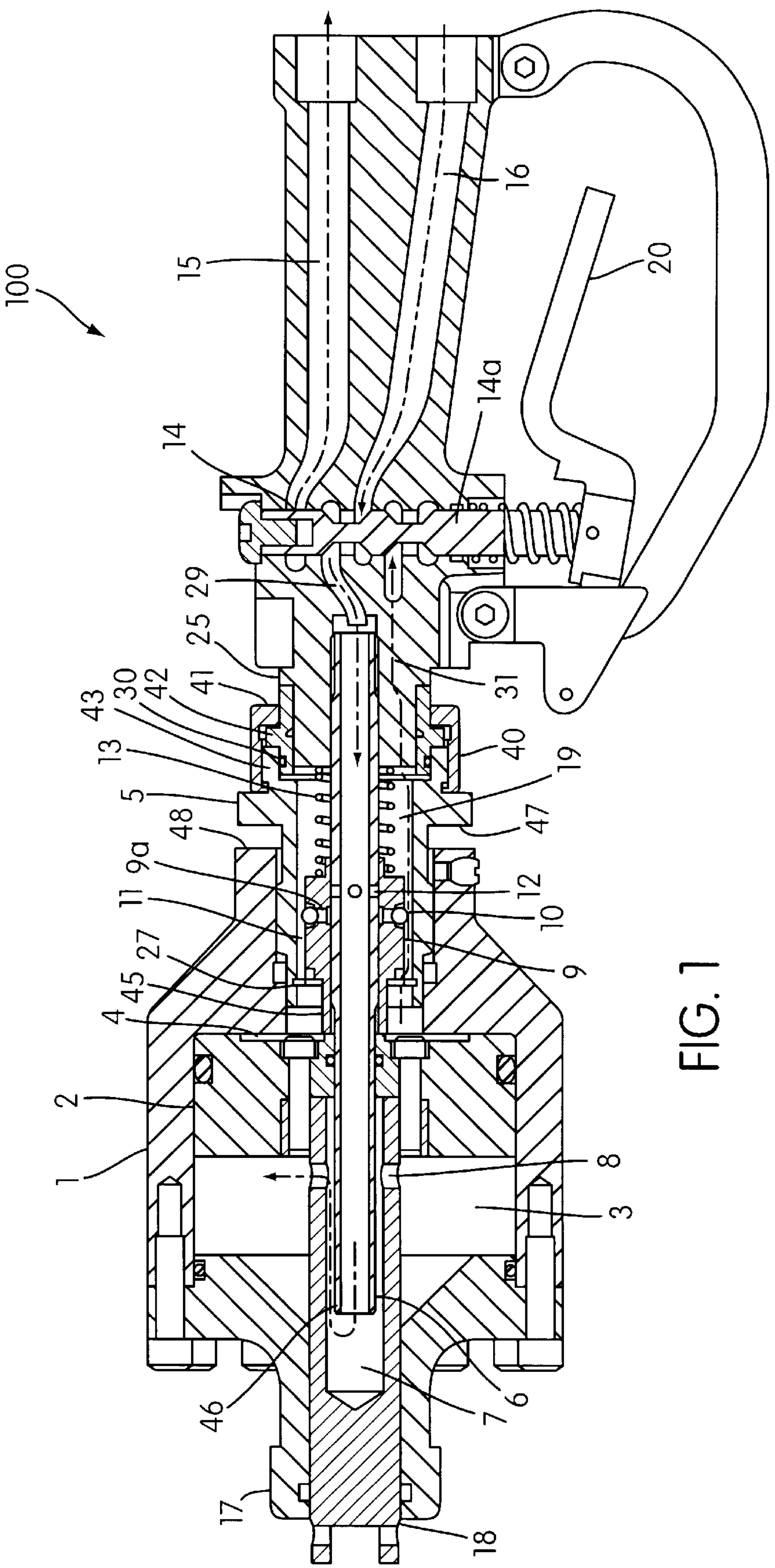
FIG. 1 illustrates a side view of a hydraulic tool in the CC mode of operation and in the neutral position, according to one preferred embodiment of the invention.
Figure 2:
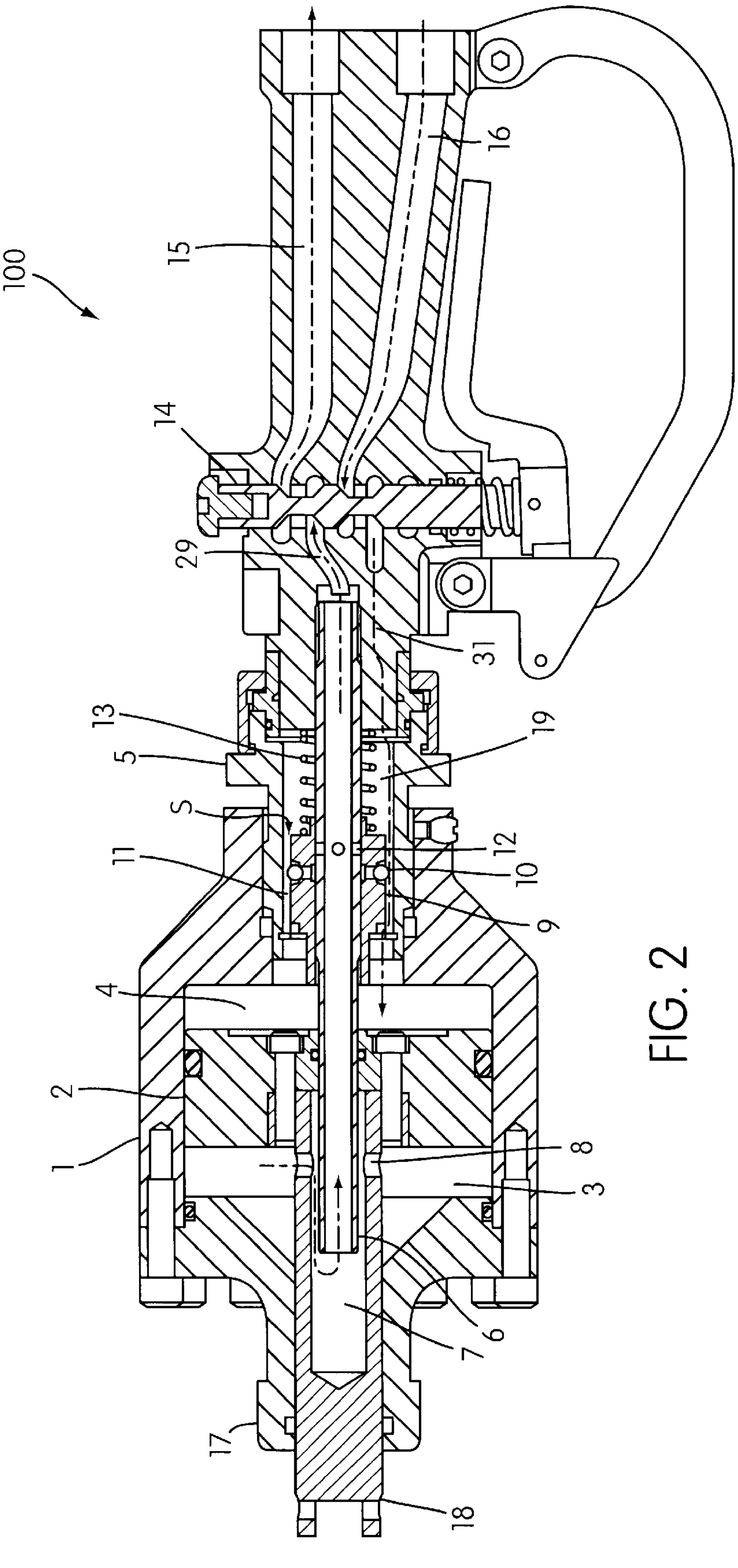
FIG. 2 illustrates the hydraulic tool in the CC mode of operation, as shown in FIG. 1, but in the working position.
Figure 3:
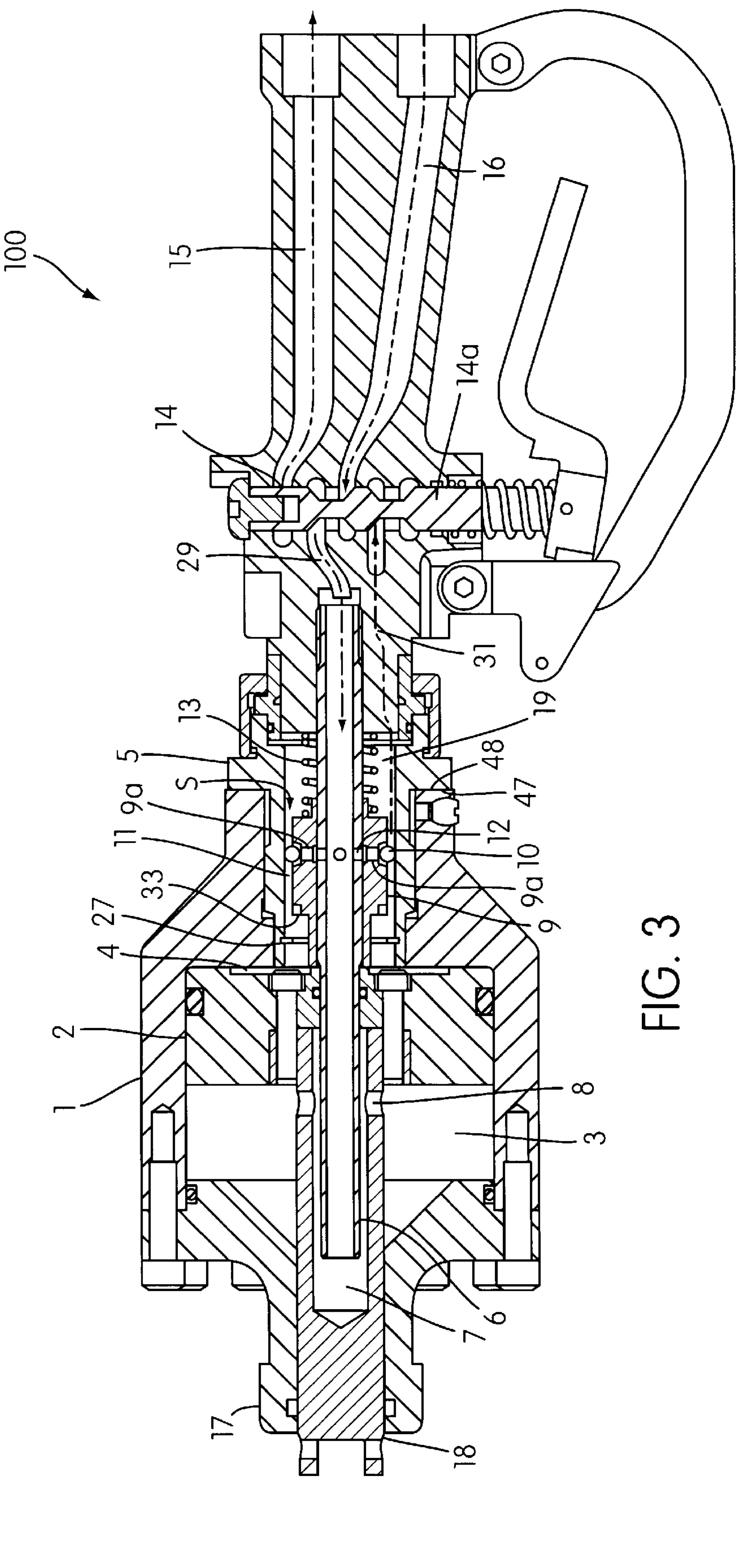
FIG. 3 illustrates a side view of a hydraulic tool in the OC mode of operation and in the neutral position.
Figure 4:
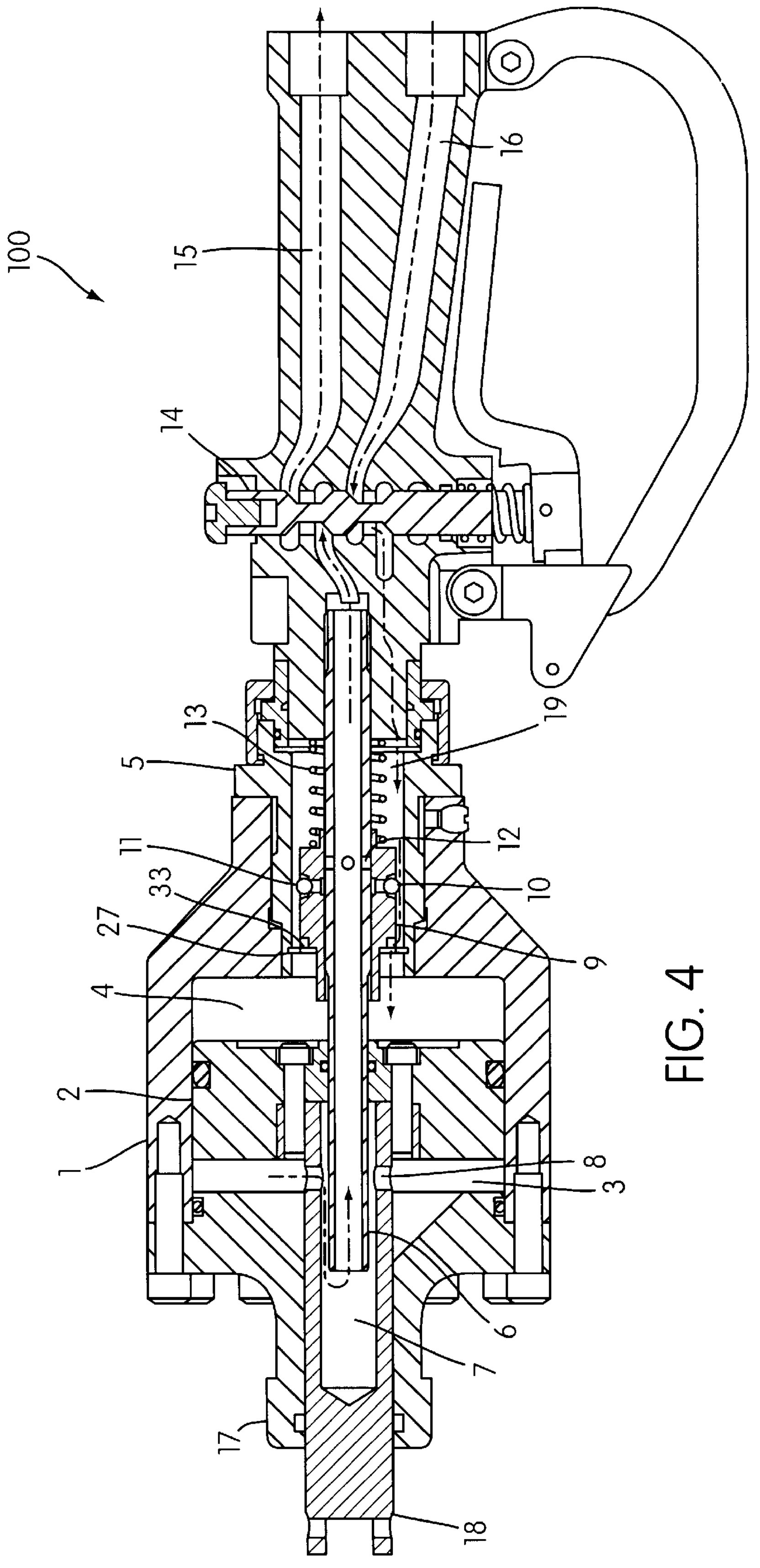
FIG. 4 illustrates the hydraulic tool in the OC mode of operation, as shown in FIG. 3, but in the working position.

FIGS. 1–4 show one example of a tool 100 that can use either a constant pressure on a constant volume source of hydraulic fluid, In this example, the tool 100 is a reciprocating type tool, although other tools, for example, of the non-reciprocating type, are also within the scope the disclosure. FIGS. 1 and 2 illustrate the CC mode of operation, while FIGS. 3 and 4 illustrate the OC mode of operation. FIGS. 1 and 3 illustrate the neutral position of the tool 100, while FIGS. 2 and 4 illustrate the working position of the tool 100.

As shown in FIG. 1, the tool 100 includes a housing 1 defining a chamber in which a piston 2 reciprocates. A mode selector 5 is preferably in the form of a sleeve that is coupled, e.g., using threads, to a portion, e.g. an interior portion, of the housing 1. A valve handle 25 is coupled to the mode selector sleeve 5, e.g., using a coupling element 40 that includes a flange 41 for engaging a radial protrusion 42 formed as part of or connected to the valve handle 25. The coupling member 40 can be threadedly coupled to an exterior surface of a flange 43 formed on the mode selector sleeve 5.

The valve handle 25 includes a valve spool 14 that communicates an inlet port 16 and an outlet port 15. The valve spool 14 includes a spool shaft 14*a* that is axially slidable within the valve handle 25 upon selective activation of a trigger 20. When the trigger 20 is activated, the inlet and outlet ports 16, 15 selectively communicate with a central port 29 and a cross port 31, using channels that are formed in the slidable spool shaft 14*a*. The valve handle 25 also includes an end 30 that is adapted to receive one end of an oil tube 6. The end of the oil tube 6 is press-fit into the end 30 of the valve handle 25 and communicates with the central port 29. The oil tube 6 includes at least one hole or passage 12. A sleeve valve 9 is slidably fitted over the oil tube 6. The sleeve valve 9 includes at least one passage or hole 9*a* that is selectively alignable with at least one passage or hole 12 in the oil tube 6 as will be described. The hole 9*a* is associated with a ball valve 10 that allows one-way flow of pressurized fluid as will be described.

A coil spring 13 is mounted in surrounding relation to an exterior surface of the oil tube 6. The spring 13 has a first end that abuts against the end 30 of the valve handle 25, and a second end which rests against a portion of the sleeve valve 9 that faces the end 30 of the valve handle 25. The spring 13 tends to bias the sleeve valve 9 towards and/or against a retaining ring 27 fixed on an inside surface of the mode selector sleeve 5. The sleeve valve 9 includes a forward extension 45 positioned toward the piston 2, for selective interaction therewith in accordance with the position of the mode selector sleeve 5, are explained more fully below.

The cylinder 1 defines a drive chamber 4 to the right side of the piston 2 (or the side of the piston 2 facing the extension 45 of the sleeve valve 9), and a retract chamber 3 to the left side of the piston 2. The positions of the drive and retract chambers could be reversed, if desired. A reciprocating ram 18 fitted within an end of the housing 1 is connected to and moves with the piston 2. The ram 18 includes a bore 7 in which a distal portion of the oil tube 6 is positioned. The ram 18 includes at least one opening 8 that communicates fluid between the retract chamber 3 and an end 46 of the oil tube 6.

The mode selector sleeve 5 is moveable, e.g. rotatable, with respect to the housing 1 to thereby create axial displacement between the housing 1 and the mode selector sleeve 5. The selector sleeve 5 can move between the closed center positions shown in FIGS. 1 and 2 and the open center positions shown in FIGS. 3 and 4. Axial movement of the mode selector sleeve 5 also causes commensurate axial movement of the valve handle 25 (via coupling sleeve 40) and the oil tube 6 relative to housing 1. The sleeve valve 9 is also axially displaceable with the oil tube 6 upon rotation of the selector sleeve 5, but the sleeve valve 9 reaches its maximum axial displacement when the sleeve valve 9 engages the retaining ring 27. That is, while the sleeve valve 9 can slide axially with respect to the oil tube 6, it moves with the tube 6 because the spring 13 pushes the sleeve 9 towards the piston 2 as the valve handle 25 is moved toward the housing 1 when the tool is switched from closed center to open center as will be described. However, the sleeve valve 9 is not rotationally constrained with respect to the oil tube 6.

Operation of the tool 100 in the CC mode will be described in relation to FIGS. 1 and 2. In FIG. 1, the tool 100 is in the neutral position, with the piston 2 in the fully retracted position. Pressurized fluid is introduced into the inlet port 16, and the spool shaft 14*a* of the valve spool 14, with the trigger 20 in the non-actuated position, channels the fluid from the inlet port 16 to the central port 29. The central port 29 delivers the fluid to the oil tube 6. Since the holes 12 in the oil tube are not aligned with the holes 9*a* in the sleeve valve 9, the fluid continues along the oil tube 6 until it reaches the bore 7, and passes through hole 8 and into the retract chamber 3. The piston 2 is maintained in the fully retracted position based on application of the fluid in the retract chamber 3 on the piston 2. Further, fluid from the drive chamber 4 is exhausted to the outlet port 15. Fluid is exhausted by passing from the drive chamber 4, through a space S (best seen in FIG. 2) between an outside surface of the sleeve valve 9 and the inside surface of the selector sleeve 5, into chamber 19, through the cross port 31 and out the outlet port 15. The holes 9*a* in sleeve valve 9 are not aligned with the hole 12 in the oil tube 6, so there can be no fluid from flowing from the space S to the oil tube 6.

When the trigger 20 is activated to perform an operation, as shown in FIG. 2, the valve spool 14 (via the spool shaft 14a) directs pressurized fluid from the inlet port 16 to the cross port 31. The cross port 31 communicates with the chamber 19, and the fluid continues past the space S between the selector sleeve 5 and the sleeve valve 9 and into the drive chamber 4. Again, the sleeve valve 9 prevents the pressurized fluid from flowing into the hole 12 in oil tube 6. The pressurized fluid in chamber 4 moves the piston 2. The reciprocating ram 18 therefore extends outside the end of the housing 1. Fluid in the retract chamber 3 is exhausted through hole 8 in ram 18, the oil tube 6, central port 29 and outlet port 15. Once the trigger 20 is released, upon completion of the operation, the valve spool 14 directs fluid as shown in FIG. 1, and the piston is returned to the fully retracted position. In this position, the piston 2 does not contact the extension 45 of the valve sleeve 9 since the mode selector sleeve 5 is positioned in the CC position, e.g., it is spaced from the end of the housing 1. The valve sleeve 9 stays in the same position in FIGS. 1 and 2, in which the holes 12 of the oil tube 6 are covered by the valve sleeve 9, i.e., the holes 9*a* and 12 do not align in the CC mode.

In FIGS. 3 and 4, the selector sleeve 5 has been rotated such that threaded engagement thereof with the interior surface of housing 1 causes the flange 47 of selector S to approach and/or abut against an end 48 of the cylinder 1. Thus, the selector sleeve 5 has moved axially toward the piston 2, as compared to the position of the mode selector sleeve 5 in FIGS. 1 and 2. However, as shown in FIG. 3, the sleeve valve 9 does not move axially the same amount as the selector sleeve 5 because the extension 45 of the sleeve valve 9 abuts against the piston 2, compressing the spring 13 in the process. Therefore, in FIG. 3, the passages 12 of the oil tube 6 are aligned with the holes 9*a* in the sleeve valve 9. The spring 13 assumes a more compressed condition, as compared to the condition of the spring 13 shown in FIGS. 1, 2 and 4, and a shoulder of the sleeve valve 9 has become disengaged from the retaining ring 27.

In the neutral position shown in FIG. 3, fluid is introduced into the inlet port 16, and the valve shaft 14*a* of the valve spool 14 directs the fluid into the central port 29, which communicates with the oil tube 6. The oil tube 6 provides the fluid to the retract chamber 3 via the holes 8. Because the holes 9*a* in the sleeve valve 9 are aligned with the holes 12 in the oil tube 6, any pressurized fluid in excess of an amount sufficient to move the piston to the retracted position passes through the passages 12 in the oil tube 6 and the holes 9*a* on the sleeve valve 9. The ball valves 10 allow the pressurized fluid to pass from the oil tube into the space S, and through the cavity 19, cross port 31 and outlet port 15. The ball valves 10 do not allow passage of fluid in the reverse direction, i.e., from the space S to the oil tube 6.

When the trigger 20 is activated as shown in FIG. 4, the valve shaft 14*a* of the valve spool 14 channels fluid as shown in FIG. 2, to cause movement of the piston 2. That is, fluid is delivered from the inlet port 16 to the cross port 31, chamber 19, space S and the drive chamber 4. As the piston 2 moves into the retract chamber 3, the extension 45 of the sleeve valve 9 extends into the drive chamber 4 under the bias of spring 13 until the shoulder 33 of the sleeve valve 9 abuts against the retaining ring 27. In this condition, the sleeve valve 9 axially slides on the oil tube 6 such that the holes 12 of the oil tube no longer align with the holes 9*a* of the sleeve valve 9. Also, the ball valves 10 do not allow fluid to pass from the space S into the holes 9*a* of the sleeve valve 9.

When the trigger 20 is released, the valve shaft 14*a* of the spool 14 redirects fluid, as shown in FIG. 3. As the piston 2 returns to the fully retracted position, the piston 2 engages the extension 45 of the sleeve valve 9. At that point, the piston 2 causes the sleeve valve 9 to slide with respect to the oil tube 6 against the bias of the spring 13, until the holes 12 of the oil tube 6 align with the holes 9*a* of the sleeve valve 9, i.e., when the piston assumes the fully retracted position, as shown in FIG. 3.

Preferred embodiments of the present invention have been described with respect to the attached drawings, which are exemplary only and not limiting. Modifications, alternations, and other combinations of elements will occur to those of ordinary skill in the art without departing from the spirit or scope of the preferred embodiments described herein.

What is claimed is:

1. A hydraulic tool switchable between an open center mode and a closed center mode and having a work mode and a neutral mode, comprising:

a cylinder defining a chamber;

a piston within the chamber and operable in the neutral mode and the work mode, the piston defining a drive chamber and a retract chamber within the chamber;

a valve operable to selectively supply hydraulic fluid to the drive chamber to thereby drive the piston to a first position when the tool is in the work mode, and to selectively supply the hydraulic fluid to the retract chamber to thereby move the piston to a second position when the tool is in the neutral mode;

a fluid inlet and a fluid outlet in fluid communication with the valve;

an oil tube in fluid communication with the valve and extending through the piston and being in communication with the retract chamber, the oil tube including opposite ends and at least one hole between said ends; and a mode selector being positionable between a first position in which the tool can operate in the open center mode in which the tool can utilize a constant volume fluid delivery source, and a second position in which the tool can operate in the closed center mode in which the tool can utilize a constant pressure fluid delivery source;

wherein, in the open center work mode the valve is configured to supply the hydraulic fluid through the oil tube to the drive chamber to drive the piston to the first position, and wherein when the tool is moved to the neutral mode, the valve is configured to supply the hydraulic fluid through the oil tube to the retract chamber such that movement of the piston to the second position can allow communication between the inlet and outlet through the at least one hole in the oil tube.

2. The hydraulic tool according to claim 1, wherein, when the tool is in the closed center mode, the drive chamber and the retract chamber do not communicate.

3. The hydraulic tool according to claim 1, wherein, when the tool is in the open center mode and the working mode, the drive chamber and the retract chamber do not communicate.

4. The hydraulic tool according to claim 1, further comprising a sleeve valve movably coupled to the oil tube to selectively expose the at least one hole in the oil tube through which the hydraulic fluid can communicate between the drive chamber and the retract chamber.

5. The hydraulic tool according to claim 4, wherein the piston selectively engages the sleeve valve in the open center mode to open and close the hole in the oil tube.

6. The hydraulic tool according to claim 5, wherein the piston does not contact the sleeve valve when the tool is in the closed center mode.

7. The hydraulic tool according to claim 4, wherein the sleeve valve includes at least one ball valve that allows only one way flow of the hydraulic fluid from the oil tube into an outlet port.

8. The hydraulic tool according to claim 4, wherein the mode selector can selectively position the sleeve valve into and out of the chamber.

9. The hydraulic tool according to claim 4, wherein the mode selector includes a retaining ring that limits the travel of the sleeve valve into the chamber.

10. The hydraulic tool according to claim 4, further comprising a spring that biases the sleeve valve towards the piston.

11. The hydraulic tool according to claim 10, wherein the spring is coupled to the oil tube.

12. The hydraulic tool according to claim 1, wherein the mode selector is rotatably coupled to the cylinder.

13. The hydraulic tool according to claim 12, wherein the mode selector is a sleeve threadedly coupled to an inside surface of the cylinder.

14. The hydraulic tool according to claim 13, wherein the mode selector includes a flange that limits insertion of the mode selector into the cylinder.

15. A hydraulic tool, comprising:

a cylinder defining a chamber;

a piston within the chamber and operable in a neutral mode and a work mode, the piston defining a drive chamber and a retract chamber within the chamber;

a valve operable to selectively supply hydraulic fluid to the drive chamber to thereby drive the piston when the tool is in the work mode, and to selectively supply the hydraulic fluid to the retract chamber when the tool is in the neutral mode; and a mode selector positionable between a first position in which the tool can operate in an open center mode in which the tool can utilize a constant volume fluid delivery source, and a second position in which the tool can operate in a closed center mode in which the tool can utilize a constant pressure fluid delivery source;

wherein in the open center mode when the tool is in the neutral mode, the valve is configured to supply the hydraulic fluid to the retract chamber until filled, whereupon any excess hydraulic fluid is exhausted to an outlet port before it reaches the chamber or the piston.

16. The hydraulic tool according to claim 15, wherein, when the tool is in the closed center mode, the drive chamber and the retract chamber do not communicate.

17. The hydraulic tool according to claim 15, wherein, when the tool is in the open center mode and the working mode, the drive chamber and the retract chamber do not communicate.

18. The hydraulic tool according to claim 15, further comprising an oil tube coupled to the valve and extending through the piston and into the retract chamber, the oil tube including at least one hole that can selectively communicate the drive chamber and the retract chamber.

19. The hydraulic tool according to claim 18, further comprising a sleeve valve movably coupled to the oil tube to selectively expose the at least one hole in the oil tube through which the hydraulic fluid can communicate between the drive chamber and the retract chamber.

20. The hydraulic tool according to claim 19, wherein the piston selectively engages the sleeve valve in the open center mode to open and close the hole in the oil tube.

21. The hydraulic tool according to claim 20, wherein the piston does not contact the sleeve valve when the tool is in the closed center mode.

22. The hydraulic tool according to claim 19, wherein the sleeve valve includes at least one ball valve that allows only one way flow of the hydraulic fluid from the oil tube into an outlet port.

23. The hydraulic tool according to claim 19, wherein the mode selector can selectively position at least a portion of the sleeve valve into and out of the chamber.

24. The hydraulic tool according to claim 19, wherein the mode selector includes a retaining ring that limits the travel of the sleeve valve into the chamber.

25. The hydraulic tool according to claim 19, further comprising a spring that biases the sleeve valve towards the piston.

26. The hydraulic tool according to claim 25, wherein the spring is coupled to the oil tube.

27. The hydraulic tool according to claim 15, wherein the mode selector is rotatably coupled to the cylinder.

28. The hydraulic tool according to claim 27, wherein the mode selector is threadedly coupled to an inside surface of the cylinder.

29. The hydraulic tool according to claim 28, wherein the mode selector includes a flange that limits insertion of the selector sleeve into the cylinder.

30. A hydraulic tool, comprising:

a cylinder defining a chamber;

a piston within the chamber and operable in a neutral mode and a work mode, the piston defining a drive chamber and a retract chamber within the chamber; and a valve operable to selectively supply hydraulic fluid to the drive chamber to thereby drive the piston when the tool is in the work mode, and to selectively supply the hydraulic fluid to the retract chamber when the tool is in the neutral modes, wherein the tool can operate in a open center mode in which the tool can utilize a constant volume fluid delivery source, and in the open center mode when the tool is in the neutral mode, the valve is configured to supply the hydraulic fluid to the retract chamber until filled, whereupon any excess hydraulic fluid is exhausted to the outlet port before it reaches the chamber or the piston.

* * * * *